Oct. 23, 1962 W. A. TAYLOR 3,059,472
LIQUID MEASURING DEVICE
Filed Oct. 9, 1959 2 Sheets-Sheet 2
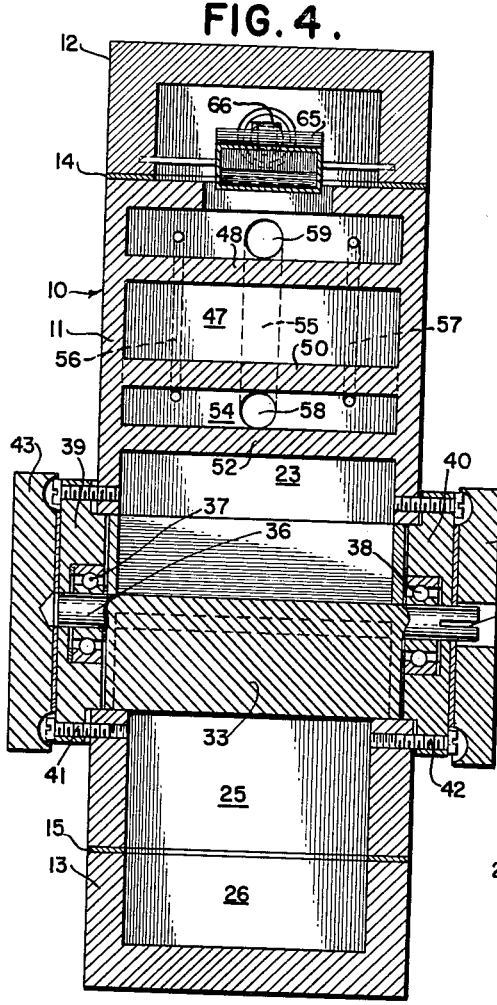
FIG. 4.
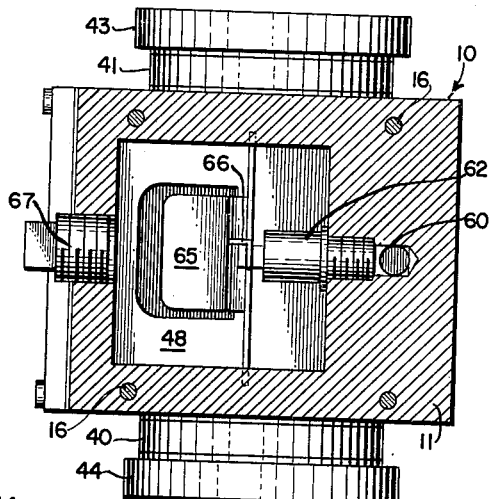
FIG. 5.
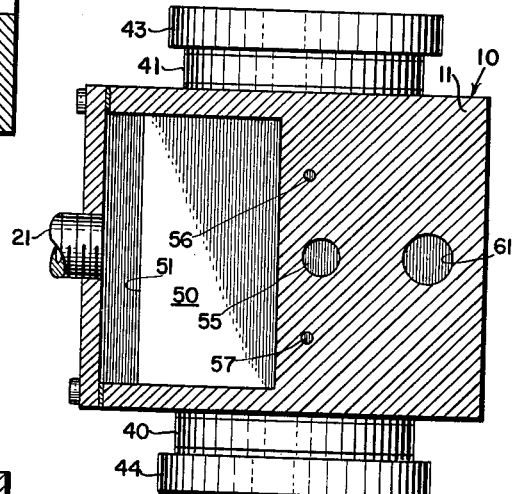
FIG. 6.
FIG. 7.
INVENTOR
William A. Taylor
BY Wilkinson, Mawhinney & Theibault
ATTORNEYS United States Patent Office 3,059,472
Patented Oct. 23, 1962

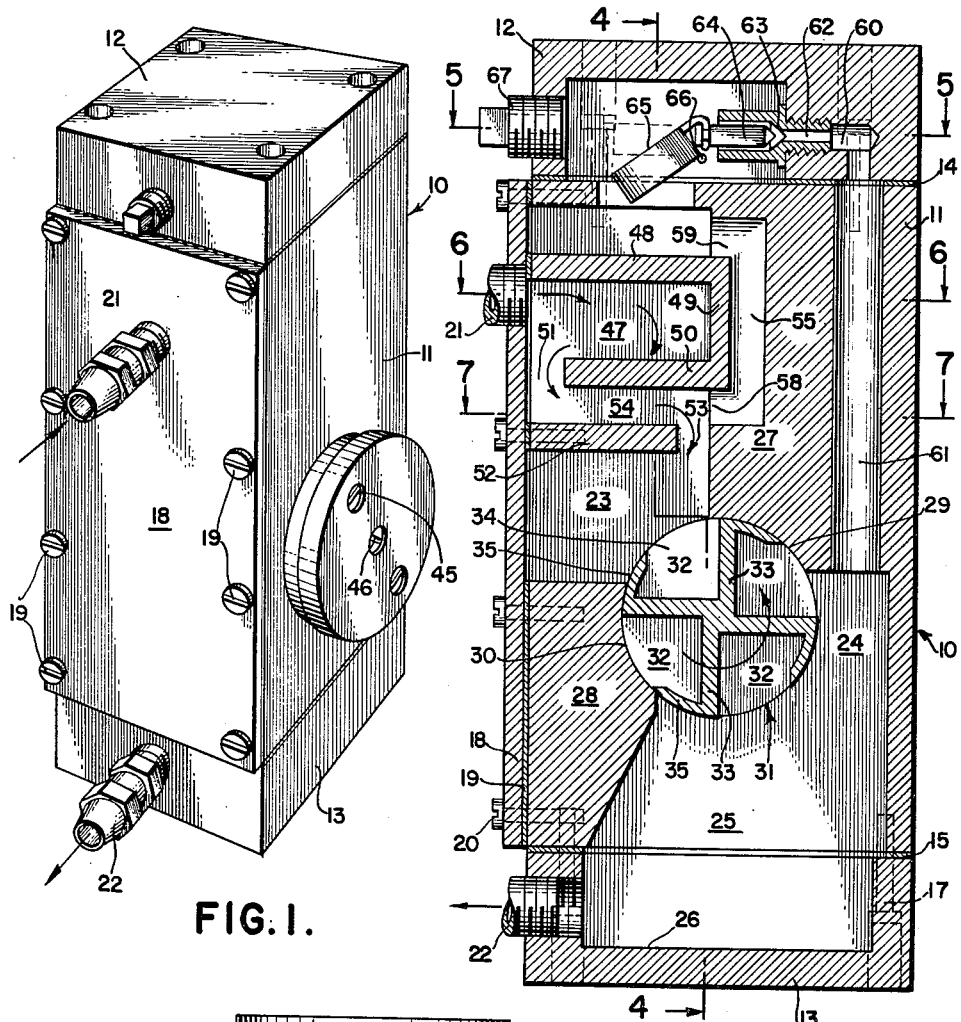

3,059,472
LIQUID MEASURING DEVICE
William A. Taylor, 634 McLaughlin, San Antonio, Tex.
Filed Oct. 9, 1959, Ser. No. 845,380
8 Claims. (Cl. 73—200)

The present invention relates to a liquid measuring device and has for an object to provide a self-contained, self-powered device for measuring liquids in which, in a completely sealed container containing residual air or other gas, a measuring impeller is in circuit with the liquid to be measured, provision being made for the free and automatic rotation of the impeller by the weight of the liquid with the entrapped air also circulated to the impeller in a relation to prevent vacuum binding of the impeller to assure its free rotation under the weight and/or current flow of the liquid to be measured.

Another object of the invention is to provide a meter or measuring device of the character above described in which separate liquid and gas chambers in the device have access to opposite sides of the metering impeller with provision for the recirculation of the gas from above the liquid in the liquid chamber to the upper portion of the air chamber and wherein provision is made for preventing any liquid from the liquid chamber spilling over into the air chamber to avoid liquid loading of the impeller on the air chamber side which would tend to render the device inoperative.

A further object of the invention resides in providing a measuring device which may be located between the fuel tank and the engine on trucks which will measure the actual fuel consumed and is not subject to tampering by truck drivers.

It is a still further object of the invention to provide a liquid measuring device of a completely closed and sealed construction having no outside vents and being capable of being immersed in the diesel or other fuel tank of trucks or the like where it may continue to operate continuously as long as the liquid fuel is circulated therethrough, having a minimum of moving parts and requiring rare accessibility for repairs or replacements.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is an isometric view of a form of liquid measuring device according to the present invention;

FIGURE 2 is a top view thereof taken on a somewhat enlarged scale;

FIGURE 3 is a vertical sectional view taken on the line 3—3 of FIGURE 2;

FIGURE 4 is a vertical sectional view taken on the line 4—4 of FIGURE 3;

FIGURE 5 is a horizontal sectional view taken through the head of the device along the line 5—5 of FIGURE 3;

FIGURE 6 is a smaller view taken through the body of the device on the line 6—6 of FIGURE 3, and FIGURE 7 is also a horizontal sectional view taken through the body of the device on the line 7—7 of FIGURE 3.

Referring more particularly to the drawings, 10 designates a casing which for manufacturing convenience and easy accessibility may be made from a central metal or other block 11 closed at its ends by an upper end head 12 and a base section 13, there being gaskets 14 and 15 between the central block and the end head 12 and base section 13 for an air and liquid tight fit.

The end head 12 and base section 13 may be securely fixed to the central block 11 by any appropriate fastenings, for instance, the screws 16 and 17 which can be tightened to place the gaskets 14 and 15 under suitable compression.

A removable side plate 18 is mounted to one side of the central block 11 and compresses a gasket 19 against the block when the screws or other fastenings 20 are tightened to hold the side plate 18 to the block.

A liquid inlet connection is shown at 21 and a liquid outlet connection at 22. The connection 21 may be coupled to an appropriate source of liquid to be measured, for instance, to the diesel or other fuel tank of a truck or other vehicle; while the outlet connection 22 is connected through suitable ducting to the desired destination of the liquid which has been measured in the casing, for instance, the liquid may be then drawn off by the pump of a diesel engine and supplied to the fuel equipment thereof.

The block is so cut out as to provide a liquid chamber 23 and a gas chamber 24. There is also a liquid outlet chamber 25 which freely communicates with the gas chamber 24 above the same, a portion of the liquid outlet chamber being provided conveniently by a well 26 in the base section 13 through the wall of which the outlet connection 22 may penetrate.

Casing block masses 27 and 28 have spaced part-cylindrical walls 29 and 30 to receive an impeller 31 of a suitable form. In the single embodiment of the invention illustrated, this impeller is in the form of a drum having compartments 32 therein separated by partitions 33 and having open peripheries 34 except for certain angular distances which are occupied by trailing arcuate walls 35. The curvature of the arcuate walls 35 conform substantially to that of the part-cylindrical walls 29 and 30 in which the impeller drum is fitted to freely rotate with preferably rather close tolerance.

This impeller drum is mounted on a shaft 36, as most clearly shown in FIGURE 4, supported for free rotation in ball bearings 37 and 38 mounted in bearing discs 39 and 40 which are held by screws 41 and 42, or other appropriate fastenings to the casing block. If desired, cover plates 43 and 44 may be fitted over the bearing discs 39 and 40, such cover plates being held as by screws 45 (FIGURE 1) to the bearing discs 39 and 40.

Through the cover plate 44 a split end trunnion 46 of the impeller shaft 36 is exposed as shown in FIGURES 1 and 4 for the purpose of coupling thereto the shaft of a counter mechanism (not shown) of any desired type which may be located remotely from the measuring device at a location where the same may be conveniently read.

In FIGURES 3 and 6 particularly the liquid inlet connection 21 is shown as entering through the side plate 18 in line with a trap 47 made in the block 11. This trap may be formed by a top wall 48, an end wall 49, and a bottom wall 50 which is somewhat shorter than the top wall 48 to provide an escape gap 51 between this bottom wall 50 and the side plate 18.

Spaced below the bottom wall 50 is a baffle wall 52 attached to the side plate 18 and removable therewith. The inner end of this baffle wall 52 is spaced from the adjacent parts of the block mass 27 to provide a gap 53 above the loading side of the impeller 31. Between the walls 50 and 52 is a passage 54. The trap with the separated gaps 51 and 53 and the passage 54 forms a tortuous descent path for the liquid to be measured introduced through the connection 21.

In the block mass 27 is provided a by-pass duct 55 having angularly related ends 58 and 59 at lower and upper ends of the duct 55, which ends 58 and 59 open out through the face of the block mass 27, the one 58 just below the bottom wall 50 and the other 59 just above the top wall 48. It may be desirable to supplement the by-pass duct 55 with one or more other companion by-pass ducts 56 and 57. Where there are a plurality of such ducts it is preferred that one or more be of larger diameter or cross-section than the other for a purpose later described.

The upper ends of these ducts communicate with a head space in the end head 12 which is provided with a communication passage 60 with the upper end of a down conduit 61 in the block extending down to the gas chamber 24 and in effect forming a part thereof.

A valve casing 62 is mounted in the communicating passage 60 having a valve seat 63 therein against which a reciprocating or other type valve 64 may seat under some control, for instance, that of a float 65 coupled to the valve 64 by a suitable connection 66.

A plug 67 in the end head 12 provides for the initial boring of the passage 60 and the later access to the parts in the head 12 for servicing.

The space in the end head 12 below the closed position of the float, and above the top wall 48 of the trap, is in effect all part of the liquid chamber which is divided from the gas chamber 24, 61 by the block mass 27. The top of the head 12 above the float will always contain air, as the air will be trapped at the time the float rises and closes the valve.

It will be seen from FIGURE 3 that removal of the side plate 18 gives access to the trap and to the liquid chamber 23 and to other interior parts.

In operation, liquid to be metered is supplied under pressure or otherwise through the connection 21 to the trap 47, which latter is effective to check surge. Surge is also checked by the tortuous passage 51, 54, 53 through which the liquid is compelled to travel in a downward direction before entering the chamber 23. As the incoming liquid will be under a substantially constant flow, the chamber 23 and the trap will rapidly fill up building up a hydrostatic pressure causing the liquid to enter a compartment 32 of the impeller drum and by its weight and/or current flow, and by reason of the offset disposition of the liquid weight mass in the compartment 32, which weight mass is eccentric to the rotation center of the impeller, will cause such impeller to rotate in a counter-clockwise direction, viewed in FIGURE 3. As the drum rotates the compartments 32 thereof will thus be brought successively into alignment with the gap 53 and into communication with the chamber 23 to the end that successive compartments with the fluid and the impeller will rotate with a speed directly proportional to the volume of fluid which is allowed to flow out through outlet 22.

It will be seen that the rotation center of the impeller is substantially in vertical alignment with the front wall of the block mass 27 so that the weight of the liquid will communicate direct thrust to the partitions which are advantageously radially disposed thus taking maximum advantage of the thrust component. The trailing walls 35 of the impeller form pockets with the partitions 33 tending to retain the charges of liquid in the compartments as it is important to have full charges at all times as the volumetric capacity of the compartments will of course be related to the movement of the counter mechanism for an accurate metering of the volume of liquid passing through the impeller.

As a recently loaded compartment of the impeller descends under the load of liquid to a position where its trailing wall 35 passes to the right (FIGURE 3) of the cylindrical wall 30, the liquid in the compartment will gradually begin to be dumped gravitationally downwardly into the discharge or delivery chamber 25, 26. In order that the device not become air bound or vacuum locked, the compartments of the impeller as the same are presented to the chambers 24 and 25 must have free access to air or some other gas or at least to another liquid having a substantially lower specific gravity than the liquid being metered. In other words, as the emptying and emptied compartments rotate around anti-clockwise they will fill with air from the chamber 24 and pass around filled with air to the liquid chamber 23. Due to the weight of the liquid, such liquid entering the compartments of the impeller will displace the air which will bubble up through the liquid column in the chamber 23 and in its upper extension through the by-pass duct or ducts and into the valve chamber above. As shown in FIG. 3, the valve 64 is biased to an open position so that normally this liberated air will pass through the communication passage 60 down the conduit 61 and re-enter the gas chamber 24 in which there is constantly being formed a partial vacuum due to the movement of air therefrom into the compartments of the impeller.

Should the liquid rise to too great a height in the liquid chamber before the same can pass through the communicating passage 60, it will encounter the float 65 and raise the same to the dotted line position of FIGURE 3, thus closing the valve and preventing the entry of any liquid over into the gas chamber. Should such liquid build up in any substantial quantity in the gas chamber 24 so as to liquid load the impeller compartments on the gas chamber side, such action would result in stalling the impeller and would render the device temporarily inoperative as the impeller would be equally balanced by the equal weights on opposite sides of its center.

The liquid dumped into the liquid discharge chamber 25, 26 is withdrawn through the connection 22, being pumped out, for instance, by the fuel pump of the diesel engine.

Thus, the device is actuated continuously by the mere movement therethrough of the liquid to be metered. The device is entirely sealed and has no vents so, if desired, it may be immersed in the fuel tank to cite one inaccessible location of the device to avoid tampering therewith by truck drivers. The air supply is that at atmospheric pressure which is automatically included when the device is sealed and no further air is needed although small amounts may be entrained with the entering liquid and some small amounts may also be removed with the discharge liquid.

When the liquid has risen up through the ducts 55, 56 and 57 to partially fill the head and activate the float, subsequent air released from the impeller into chamber 23 will rise to the base of the ducts 55, 56 and 57. The liquid will then flow down through the larger duct 55 and the air will flow up through the smaller duct 56, or 57, or both, thus replacing the liquid in the head with air, which will lower the float and open valve 64.

There are few moving parts and the device will operate over long periods of time without requiring any attention.

Although I have disclosed herein the best form of the invention known to me at this time, I reserve the right to all such modifications and changes as may come within the scope of the following claims.

What is claimed is:

1. A liquid measuring device comprising a casing having spaced liquid and gas chambers, a liquid supply to the liquid chamber, means of communication between upper portions of the chambers, a counter impeller mounted for rotation between lower portions of the chambers and having access at opposite sides to the liquid and gas, a trap including staggered baffle walls providing a tortuous course for the liquid descending to the impeller, and a liquid outlet below the impeller.

2. A liquid measuring device as claimed in claim 1 in which the casing has a by-pass about the trap setting up communication between the trap discharge and the upper portion of the liquid chamber.

3. A liquid measuring device according to claim 2 in which said by-pass includes a plurality of spaced ducts.

4. A liquid measuring device as claimed in claim 3 in which at least two of the ducts are volumetrically dissimilar.

5. A liquid measuring device as claimed in claim 3 in which at least two of the ducts have differential cross-sectional areas.

6. A liquid measuring device comprising a casing having an impeller therein; spaced inlet and outlet means for a liquid to be measured and means for communicating said means with opposite sides of said impeller; the means communicating with said inlet means comprising liquid trap means defining a circuitous path for receiving liquid entering through said inlet means, a generally horizontal baffle wall receiving at one end liquid from said trap means and defining a supporting surface for said liquid, said baffle wall having a free end opposite said one end, a chamber below and communicating with the space adjacent the free end of said wall; said impeller forming one boundary of said chamber; said communicating means including a chamber between said impeller and said outlet means; and air passage means etxending between said last mentioned chamber and said space.

7. The apparatus of claim 6, said last mentioned means including float valve means.

8. The apparatus of claim 6, said inlet and outlet means constituting the sole access means thereinto.

References Cited in the file of this patent

UNITED STATES PATENTS

| | | |
|---|---|---|
| 1,575,782 | Mowry | Mar. 9, 1926 |
| 1,888,524 | Wright | Nov. 22, 1932 |
| 2,078,058 | Chirca | Apr. 20, 1937 |
| 2,411,261 | Granberg | Nov. 19, 1946 |